United States Patent
Kumar BVN et al.

(10) Patent No.: US 10,356,486 B2
(45) Date of Patent: Jul. 16, 2019

(54) SKIPPING ADVERTISEMENTS BASED ON ADVERTISEMENT-WATCHING SCORE

(71) Applicant: Adobe Inc., San Jose, CA (US)

(72) Inventors: Pavan Kumar BVN, Bangalore (IN); Kiran Chandra Zagabattuni, Bangalore (IN); Angela Ranjeet, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/987,650

(22) Filed: Jan. 4, 2016

(65) Prior Publication Data
US 2017/0195745 A1    Jul. 6, 2017

(51) Int. Cl.
*H04N 21/81* (2011.01)
*H04N 21/442* (2011.01)
*H04N 21/2387* (2011.01)
*H04N 21/6587* (2011.01)

(52) U.S. Cl.
CPC ....... *H04N 21/812* (2013.01); *H04N 21/2387* (2013.01); *H04N 21/44204* (2013.01); *H04N 21/6587* (2013.01)

(58) Field of Classification Search
CPC .... H04N 7/16; H04N 21/812; H04N 21/2387; H04N 21/44204; H04N 21/6587
See application file for complete search history.

(56) References Cited

U.S. PATENT DOCUMENTS

| | | | | |
|---|---|---|---|---|
| 2009/0076904 | A1* | 3/2009 | Serena | G06Q 30/02 705/14.1 |
| 2012/0278831 | A1* | 11/2012 | van Coppenolle | H04L 65/4084 725/25 |
| 2014/0317653 | A1* | 10/2014 | Mlodzinski | H04N 21/812 725/32 |
| 2016/0007083 | A1* | 1/2016 | Gurha | H04N 21/44222 725/13 |

* cited by examiner

*Primary Examiner* — Sumaiya A Chowdhury
(74) *Attorney, Agent, or Firm* — SBMC

(57) ABSTRACT

Various implementations provide an improved advertisement model that enables users to skip advertisements based on an advertisement-watching score. That is, as a user watches advertisements or, in some cases, portions of advertisements, an advertisement-watching score is computed. The more advertisements that a user watches, the higher their advertisement-watching score will be. When the user's advertisement-watching score reaches or exceeds a certain threshold, the user is provided with an option to skip subsequent advertisements so that they can consume their content in a generally uninterrupted manner. When an advertisement is skipped, the user's advertisement-watching score is decreased by an amount. If the user's advertisement-watching score is decreased to below the threshold, the user cannot skip additional advertisements until the advertisement-watching score again reaches or exceeds the threshold. The user can cause their advertisement-watching score to increase by watching additional advertisements or, in some cases, portions of advertisements.

20 Claims, 8 Drawing Sheets

SKIPPING ADVERTISEMENTS BASED ON ADVERTISEMENT-WATCHING SCORE

BACKGROUND

Having to watch a video advertisement on a computing device prior to consuming content, such as a streaming video, can be annoying to some consumers. This is particularly the case if the user is very interested in the content and would rather watch the content. Oftentimes users can shorten the video advertisements by choosing available options such as a "skip" button after 5 or 10 seconds. Sometimes, however, an option to shorten the video advertisement is not provided and, frustratingly, the user must wait for the video advertisement to fully run.

This less than desirable situation affects many different parties including content publishers, advertisers, and end-users. Content publishers are affected because the content is not consumed in an uninterrupted context in which the user can dedicate their full attention to the content. Further, the content publisher may see a revenue impact because the user may skip the advertisement or just wait until the advertisement is over without clicking on the advertisement. Advertisers are affected because their advertisements are seen as a distraction to the content viewing experience or can often be skipped. End-users are affected because their perceived content viewing experience is disjointed and annoying. And, while ad views or impressions may not be affected much, click through rates can suffer because viewers may not watch or click the video advertisement because they are eager to get back to watching the content. "Click through rate" in advertising refers to the number of users who click on a specific link out of the total users who view an advertisement, and measures the success of an online advertising campaign.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various implementations provide an improved advertisement model that enables users to skip advertisements based on an advertisement-watching score. That is, as a user watches advertisements or, in some cases, portions of advertisements, an advertisement-watching score is computed for them. The more advertisements that a user watches, the higher their advertisement-watching score will be. When the user's advertisement-watching score reaches or exceeds a certain threshold, the user is provided with an option to skip subsequent advertisements so that they can consume their content in a generally uninterrupted manner. When an advertisement is skipped, the user's advertisement-watching score is decreased by an amount. If the user's advertisement-watching score is decreased to below the threshold, the user cannot skip additional advertisements until the advertisement-watching score again reaches or exceeds the threshold. The user can cause their advertisement-watching score to increase by watching additional advertisements or, in some cases, portions of advertisements.

In one or more implementations, a digital medium environment includes a computing device that is configured to use a video hosting platform to enable a video player to play content and advertisements. An improved advertisement skipping method is implemented by the computing device and comprises receiving, by the video player and from the video hosting platform, content having one or more associated advertisements, the content being configured to be viewed by a user of the video player. A determination is made as to whether an advertisement-watching score of the user qualifies to enable the user to skip one or more of the advertisements. Responsive to the user's advertisement-watching score not qualifying to enable the user to skip the one or more advertisements, the video player plays at least one of the one or more advertisements. Responsive to the user's advertisement-watching score qualifying to enable the user to skip the one or more advertisements, the user is enabled to skip at least one of the one or more advertisements.

In one or more other implementations, a digital medium environment includes a computing device that is configured to use a video hosting platform to enable a video player to play content and advertisements. One or more computer-readable storage media comprise instructions that are stored thereon that implement improved advertisement skipping which, responsive to execution by the computing device, perform advertisement skipping operations comprising monitoring a user's advertisement watching. A determination is made as to whether the user's advertisement watching has been terminated. Responsive to the user's advertisement watching being terminated, a determination is made as to whether an advertisement-watching threshold has been met. The advertisement-watching threshold defines whether or not an advertisement-watching score of the user is to be computed. Responsive to the advertisement-watching threshold being met, an advertisement-watching score is computed. The advertisement-watching score is configured to enable a user to skip one or more advertisements.

In one or more other implementations, a system implemented in a digital medium environment includes a computing device that is configured to use a video hosting platform to enable a video player to play content and advertisements. The system comprises a processing system and one or more computer readable media storing instructions, executable via the processing system, to implement improved advertisement skipping by performing operations comprising receiving content having one or more associated advertisements. The content is configured to be viewed by a user of the video player. A determination is made as to whether an advertisement-watching score of the user qualifies to enable the user to skip one or more of the advertisements. Responsive to the user's advertisement-watching score not qualifying to enable the user to skip the one or more advertisements, at least one of the one or more advertisements is played and the user's advertisement-watching score is updated by: computing a first component associated with watching an advertisement, computing a second component associated with whether or not the advertisement was clicked, summing the first and second components to produce a sum, and adding the sum to a previous advertisement-watching score of the user. Responsive to the user's advertisement-watching score qualifying to enable the user to skip the one or more advertisements, the user is enabled to skip at least one of the one or more advertisements. Responsive to the user opting to skip the at least one of the one or more advertisements, the user's advertising-watching score is decremented.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
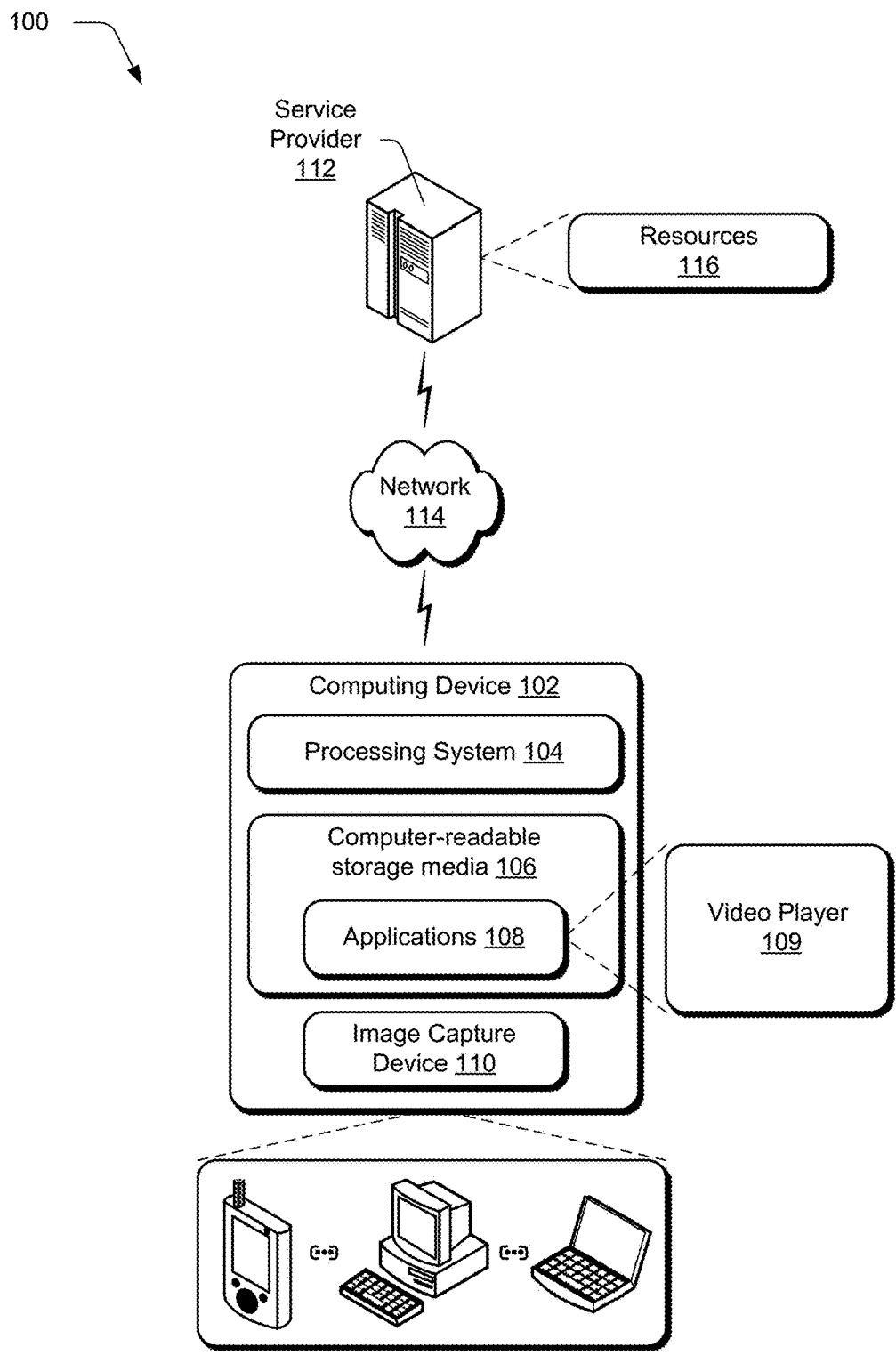
FIG. 1 is an illustration of a digital medium environment in an example implementation that is operable to employ techniques described herein.

As noted above, users can become annoyed when they have to watch a video advertisement on a computing device prior to consuming content, such as a streaming video. That is, when a user uses a video player application to select video content to consume, the content is often accompanied by one or more video advertisements. Typically, the video advertisement is played before the content is consumed and, in some instances, may be played intermittently while the user consumes the content. If the user is interested in the content, they may consider such advertisements as annoying and distracting from their content-consuming experience.

The various implementations improve upon this situation by providing an improved advertisement model that enables users to skip advertisements based on an advertisement-watching score that is computed for the user. That is, when a user logs into their video player or video playing account, as the user watches advertisements or, in some cases, portions of advertisements, an advertisement-watching score is computed for them. Any suitable approach can be used for computing an advertisement-watching score. For example, each time a user watches an advertisement, the user's advertisement-watching score can be incremented by an amount associated with the advertisement that was just watched. In some implementations, the points associated with the advertisement can be set by the advertiser. Any suitable approach can be utilized to set the points associated with an advertisement. For example, the points associated with a particular advertisement can be linked to or otherwise a function of a cost function associated with the advertisement. One cost function is the "Cost per thousand impressions" or "CPM". The CPM refers to the cost or expense incurred (by the advertiser) for every thousand potential customers who view an advertisement. So, in some instances, the higher the CPM, the more points may be required in order to skip a particular advertisement. Points as between different advertisements can vary. For example, if the CPM as between two different advertisements varies, so too can the points associated with each advertisement. In addition, points associated with the same advertisement can vary based on demographics, location, and the like. So, for example, in one region an advertisement may have one point value, and in another region the same advertisement may have a different point value. Alternately or additionally, if a user watches only a portion of an advertisement, the user's advertisement-watching score can be incremented by an appropriate amount, which, in one embodiment, is less than the amount if the user would have watched the entire advertisement.

In some implementations, in order to qualify for an increase in the advertisement-watching score, a user must watch a predefined percentage of an advertisement. The predefined percentage can be set by a video hosting platform that hosts the content that is to be consumed. The predefined percentage is typically a standard value across all advertisements. A "video hosting platform" is typically a productized-service that enables users to upload, convert, store, obtain and play back video content. In at least some embodiments, this can occur by way of the Internet, via a structured or scalable solution that can be monetized. Other networks and models can be used without departing from the spirit and scope of the claimed subject matter. Any suitable predefined percentage can be utilized such as, by way of example and not limitation, 30 percent, 40 percent, 50 percent or more, as measured by the duration of the advertisement. For example, 50 percent of a 30-second advertisement would be 15 seconds. In some implementations, if a user watches less than the predefined percentage of an advertisement, their advertisement-watching score is not increased. If the user watches more than the predefined percentage of the advertisement, their advertisement-watching score is increased.

Further, in some implementations, in addition to including a component for watching an advertisement or a portion thereof as just described, the advertisement-watching score includes an additional component whose value is based on whether the user clicked on an advertisement or not. In this manner, the advertisement-watching score includes a component that takes into account not only whether an advertisement was watched, but also whether the advertisement was clicked on. Thus, if the user both watches the advertisement and then clicks on the advertisement, their advertisement-watching score is increased by appropriate amounts for each of these activities. In some implementations, if a user watches less than the predefined percentage of an advertisement but clicks on the advertisement, their advertisement-watching score is increased.

Thus, the more advertisements that a user watches and/or clicks on, the higher their advertisement-watching score will be. When the user's advertisement-watching score reaches or exceeds a certain threshold, the user is provided with an option to skip subsequent advertisements so that they can consume their content in a generally uninterrupted manner. The option to skip an advertisement can be presented to the user in the form of a selectable user interface instrumentality informing the user that their advertisement-watching score value now enables them to skip one or more advertisements.

In some implementations, when an advertisement is skipped, whether through the user interface instrumentality mentioned above or a generic "Skip Ad" button, the user's advertisement-watching score is decreased by an amount. If the user's advertisement-watching score is decreased to below the threshold, the user cannot skip additional advertisements until the advertisement-watching score reaches or exceeds the threshold. The user can cause their advertisement-watching score to be increased by watching additional advertisements.

The various implementations improve on past approaches because the user can watch advertisements at their leisure. That is, when a user is busy or interested in content, they can skip advertisements. When the user is not busy, he or she can watch advertisements at their leisure. Additionally, the implementations promote advertisement engagement because not only can the user watch advertisements at their leisure as mentioned above, but when the user's advertisement-watching score is below the threshold, the user is forced to watch the advertisement before consuming their content. By virtue of the score-based skip feature, users can watch their favorite content without major interruptions when their score permits. Advertisers will see increased revenue as the click through rates of advertisements will likely increase. This is because, as the user is now free to view advertisements at their leisure, there is an increased likelihood that the user may become interested in an advertisement and click it. Content publishers will benefit as well because their content will be watched with less interruption. Additionally, content publisher revenues will increase since the click through rates of advertisements will increase.

In one or more implementations, a digital medium environment includes a computing device configured to use a video hosting platform to enable a video player to play content and advertisements. An improved advertisement skipping method is implemented, in one embodiment, by the computing device and comprises receiving, by the video player and from the video hosting platform, content having one or more associated advertisements. The content is configured to be viewed by a user of the video player. A determination is made as to whether an advertisement-watching score of the user qualifies to enable the user to skip one or more of the advertisements. Responsive to the user's advertisement-watching score not qualifying to enable the user to skip the one or more advertisements, the video player plays at least one of the one or more advertisements. Responsive to the user's advertisement-watching score qualifying to enable the user to skip the one or more advertisements, the user is enabled to skip at least one of the one or more advertisements. The advertisement skipping method can, in other embodiments, be implemented by a server or a combination of other computing devices including a client and server combination. For example, aspects of an advertising-watching score component, described below, can be implemented in a distributed fashion with some functions taking place on a client device and other functions taking place on a server. For example, a video player executing on the client device can receive content and advertisements and monitor the user's advertisement watching activities and report those activities to the server. The server, in turn, can then compute the user's advertisement-watching score and notify the video player of the score and/or whether the user can skip an advertisement. The server can maintain a database of user information and scores across a large number of users.

As an example, consider the following. It is Sunday morning and Jane logs into her account on her video player to begin playing videos. Jane starts playing some videos on her video player on a video hosting platform. The videos are accompanied by a few advertisements. An advertisement is slated to play before each particular video is viewed. Some of the advertisements have a "skip" option and some of the advertisements do not. Instead of skipping the advertisements, Jane watches all of the advertisements completely.

Each time Jane watches an advertisement, some points get added to her advertisement-watching score. While she was watching the advertisements, one of the advertisements interested her, so she clicked on the advertisement and was redirected to the advertiser's website. The content publisher was notified of the advertisement click and, correspondingly, the click-through rate for the content publisher increased. The click through also resulted in additional points being added to her advertisement-watching score. Now, it's Monday morning and Jane wishes to cook breakfast while watching a recipe video on the same video hosting platform. Jane again logs in, but this time she wants to watch her video without any interruptions. Assume that Jane's advertisement-watching score is above the threshold necessary to enable advertisements to be skipped. When she starts her recipe video, a user interface instrumentality informs Jane that she can use her advertisement-watching score to skip any advertisements accompanying her video. She opts to skip the advertisements and, as such, her advertisement-watching score is decreased by a corresponding amount. She can continue to use her advertisement-watching score to skip advertisements as long as it is above the threshold. If she wishes to increase her advertisement-watching score, Jane simply needs to once again watch advertisements that accompany her content, either in this session or subsequent sessions.

In the following discussion, an example digital medium environment is first described that can employ the techniques described herein. Example implementation details and procedures are then described which can be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein. In at least some implementations, applications 108 include or otherwise make use of a video player 109. In some implementations, the video player 109 is a standalone application. In other implementations, the video player 109 is included as part of another application or system software such as a computing device's operating system. The video player 109 is configured to enable video content, such as streaming video, video files, and the like, to be received, processed and consumed by a user of the computing device. The video player 109 is also configured to receive video advertisements and process the advertisements as described above and below. Specifically, the player enables the user to view videos and advertisements associated with the videos. The video player also includes functionality that enables an advertisement-watching score to be computed for a particular user, and for advertisements to be skipped based on the advertisement-watching score as described above and below in more detail.

This permits the user to skip an advertisement and to consume at least some of their content in a generally uninterrupted manner.

Applications 108 may also include a web browser which is operable to access various kinds of web-based resources (e.g., content and services). In at least some implementations, the applications include one or more video players, such as Adobe® Flash® Player, a YouTube™-type application, and the like. In at least some implementations, the applications 108 represent a client-side component having integrated functionality operable to access web-based resources (e.g., a network-enabled application), browse the Internet, interact with online providers, and so forth. Applications 108 further include an operating system for the computing device 102 and other device applications.

The computing device 102 may also, but need not, include an image capture device 110, such as a camera, that can capture images.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The digital medium environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. The service providers 112 can provide one or more video hosting platforms. As noted above, a "video hosting platform" is typically a productized-service that enables users to upload, convert, store, obtain and play back video content on the Internet, often via a structured, scalable solution that can be monetized. In some scenarios, users may sign up for accounts that are employed to access corresponding resources, such as streaming video, from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a notification service (such as one that sends various types of notifications to applications 108 and video player 109), a content publisher service that distributes content, such as streaming videos and the like, to various computing devices, an advertising server service that provides advertisements to be used in connection with distributed content, a web development and management service, a collaboration service, a social networking service, a messaging service, and so forth. Content may include various combinations of assets, video comprising part of an asset, advertisements, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of a video player 109 in accordance with one or more implementations.

Example Video Player

Figure 2:
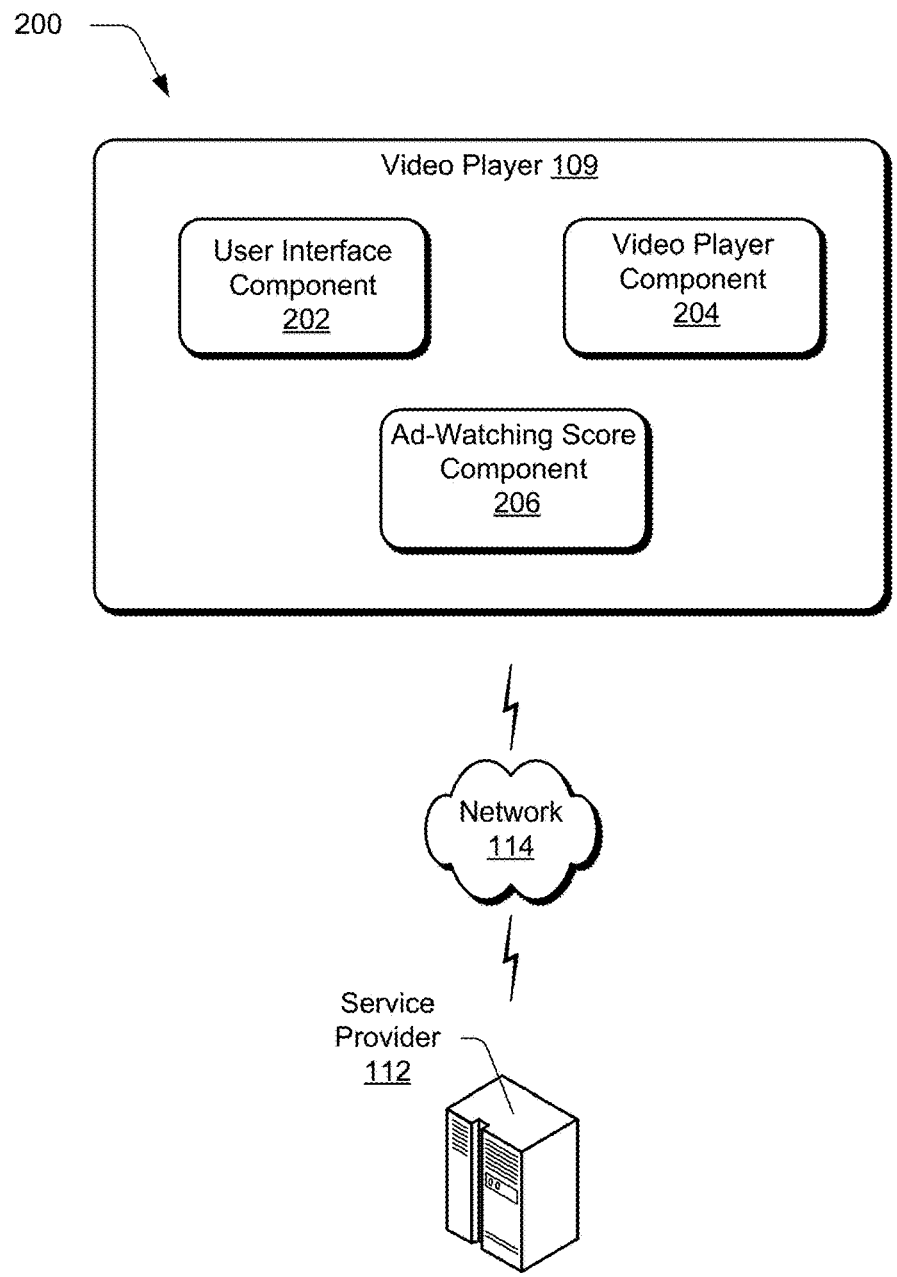
FIG. 2 illustrates an example video hosting platform and its component parts in accordance with one or more implementations.

FIG. 2 illustrates a digital medium environment 200 that includes an example video player 109. In this implementation, the video player 109 includes, among other components, a user interface component 202, a video player component 204, and an advertisement-watching score component 206. It is to be appreciated and understood, however, that aspects of the functionality of the video player 109 can be implemented by a remote entity, such as one or more servers in a cloud-based environment. When implemented using a remote entity, in some implementations, one or more components of the video player 109 can be present on the remote entity or can be present at both the computing device 102 and the remote entity. In addition, the components present at the computing device 102 can perform syncing operations with the components present at the remote entity.

The user interface component 202, video player component 204, and advertisement-watching score component 206 work together to allow a user to search for, acquire, and consume video content, along with one or more associated advertisements. These components also enable a user to accumulate an advertisement-watching score each time they watch an advertisement. When the score reaches or exceeds a defined threshold, the user is then able to skip one or more advertisements as long as their score remains above the defined threshold. The user's advertisement-watching score can be maintained both locally and remotely, as by a video hosting platform by way of the user's log in account. As there can be different video hosting platforms to which a user may be subscribed or registered, there can be different advertisement-watching scores for the user across these different video hosting platforms.

User interface component 202 is representative of functionality that provides a user interface with various user interface instrumentalities with which a user may interact. For example, the user interface component can provide a user interface instrumentality that is selectable by a user to consume content, such as streaming videos and the like. For example, in some implementations, when content is received, a video player component 204 can be launched to play the content. When an associated advertisement is received and is either queued for playing or played, if the user's advertisement-watching score is at or above a certain threshold, the user can be informed of this and a user interface instrumentality in the form of a user-selectable button can be rendered to enable the user to skip the advertisement.

Video player component 204 is representative of functionality that enables video content and associated advertisements to be played.

The advertisement-watching score component 206 is representative of functionality that computes and maintains an advertisement-watching score for a user. The advertisement-watching score can be provided to a remote video hosting platform and maintained as part of the user's log in information. This way, a user can log into their account from different devices and have their advertisement-watching score available across these different devices. Specifically, the advertisement-watching score component 206 can increment an advertisement-watching score for a particular user each time the user watches an advertisement or a portion of an advertisement. The advertisement-watching score component can also monitor whether a user's advertisement watching score meets or exceeds a defined threshold. If a user's advertisement-watching score meets or exceeds a defined threshold, then the advertisement-watching score component can cause, through the user interface component 202, a user interface instrumentality to be presented to the user to enable the user to skip a particular advertisement. The advertisement-watching score component can also decrement the user's advertisement-watching score for each advertisement that the user opts to skip.

In this manner, the video player 109 can reward users for watching advertisements by enabling the users to watch their favorite content without interruption by skipping advertisements when their advertisement-watching score meets or exceeds a defined threshold.

The digital medium environment 200 also includes network 114 and service provider 112 described above in detail.

Having considered an example video hosting platform and its components, consider now an example device and user interface in accordance with one or more implementations.

Example User Interface

Figure 3:
FIG. 3 illustrates an example computing device in accordance with one or more implementations.

FIG. 3 illustrates an example digital medium environment 300 that includes a computing device 301 in the form of a mobile computing device. Computing device 301 includes a display 302 in which a user interface is shown. The user interface can be provided by a suitably configured component such as user interface component 202 (FIG. 2). In this particular example, the user interface includes a search bar 304 in which a user enters search terms to search for content that they wish to consume. In addition, the user interface includes a number of selectable categories, shown generally at 306, that a user can select for conducting a search. For example, if the user simply wishes to search for content without specifying a category, they can simply enter a search term in search bar 304. If, on the other hand, the user is interested in searching for a specific category of content, such as TV shows, they can click on the "TV shows" category and then enter a search term in search bar 304.

Having considered an example user interface, consider now how an advertisement can be skipped in accordance with one or more implementations.

Skipping Advertisements

Often times when a user receives consumable content on their computing device, such as streaming videos, the content will be accompanied by, or be otherwise associated with one or more video advertisements that are to be played before or while the content is consumed. So, perhaps the user browsed to a video viewing service, such as Adobe Primetime, to select a multimedia video for viewing. In addition to receiving the multimedia video, the user's computing device may also receive one or more advertisements from an advertisement server, such as Adobe Auditude.

Figure 4:
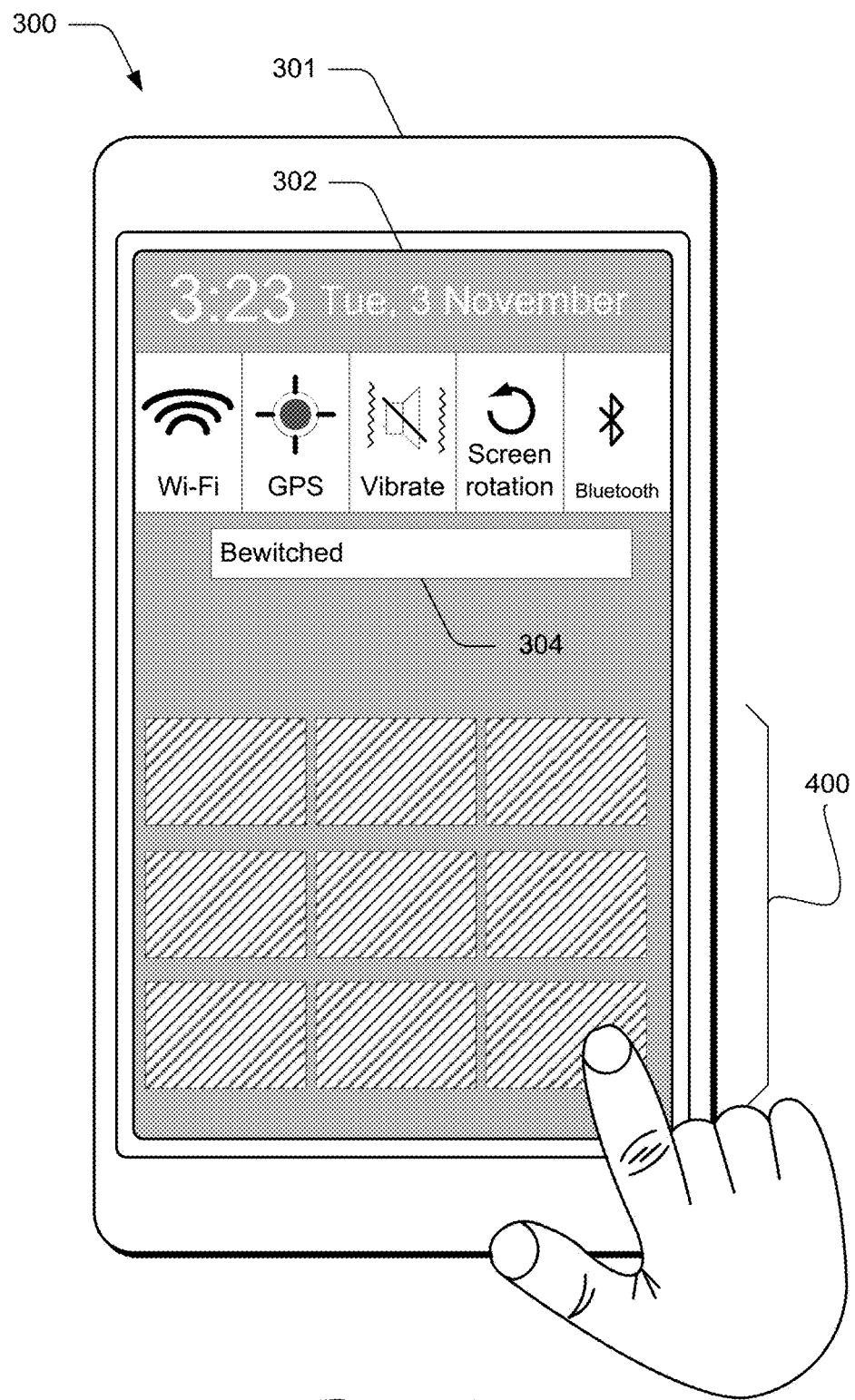
FIG. 4 illustrates an example computing device in accordance with one or more implementations.

As an example, consider FIG. 4 in which a user has entered the search term "Bewitched" in the search bar 304. The search term causes a search to be conducted and returns a number of search results of television episodes of the show Bewitched, shown generally at 400. Each episode is represented by a cross-hatched rectangle. The user is now free to browse through and select an episode for viewing. Assume that the user selects a particular episode, as indicated by the user's hand.

When the user selects an episode, an advertisement is played by the user's video player. Assume that the user watches the advertisement to completion and then watches her Bewitched episode. Assume also that the user, over a period of time, watches a number of advertisements to completion. This causes her advertisement-watching score to increase in accordance with the number of advertisements she watches.

Assume now that the user's advertisement-watching score exceeds a defined threshold such that she is now able to skip advertisements. As example, consider that the user has selected a piece of content for viewing, such as in FIG. 4. As an example, consider FIG. 5.

Figure 5:
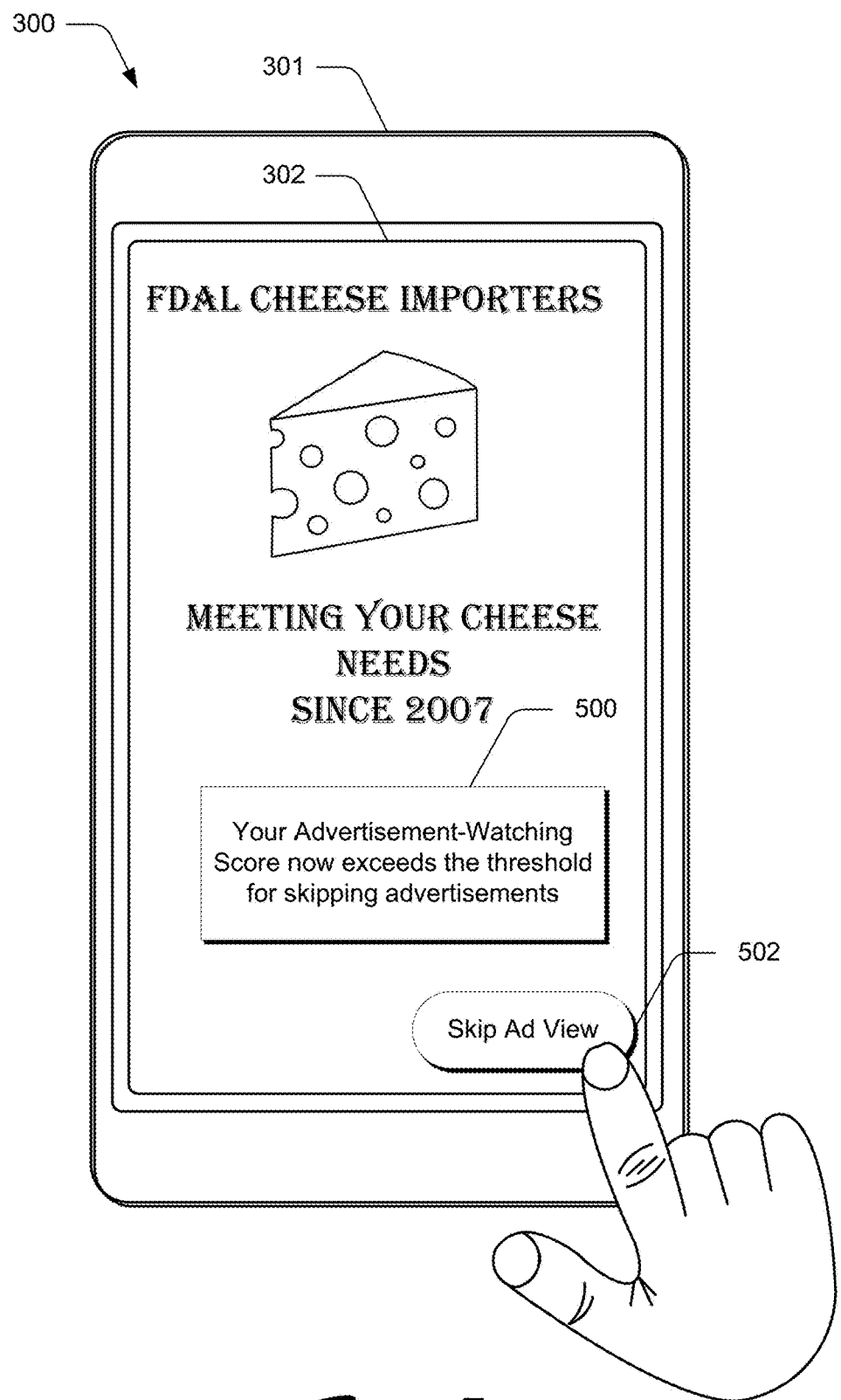
FIG. 5 illustrates an example computing device displaying user interface instrumentalities in accordance with one or more implementations.

In the FIG. 5 example, assume that a user has selected content for viewing and has received an advertisement along with the content. In this particular example, the advertisement is for "FDAL Cheese Importers" and includes a short 20 second video for this business. Because the user's advertisement-watching score exceeds the defined threshold, a notice 500 is presented informing the user that her score now exceeds a threshold for skipping advertisements. In addition, a selectable user interface instrumentality 502 is rendered and enables the user to skip the particular advertisement. In this instance, the user has opted to skip the particular advertisement so that she can proceed directly to her content. In doing so, the user's advertisement-watching score is now decremented by an amount. She may continue to skip advertisements as long as her advertisement-watching score remains at or above the defined threshold. If, however, her advertisement-watching score drops below the defined threshold, she will not be able to skip any further ads, using this feature, until her advertisement-watching score meets or exceeds the threshold.

Figure 6:
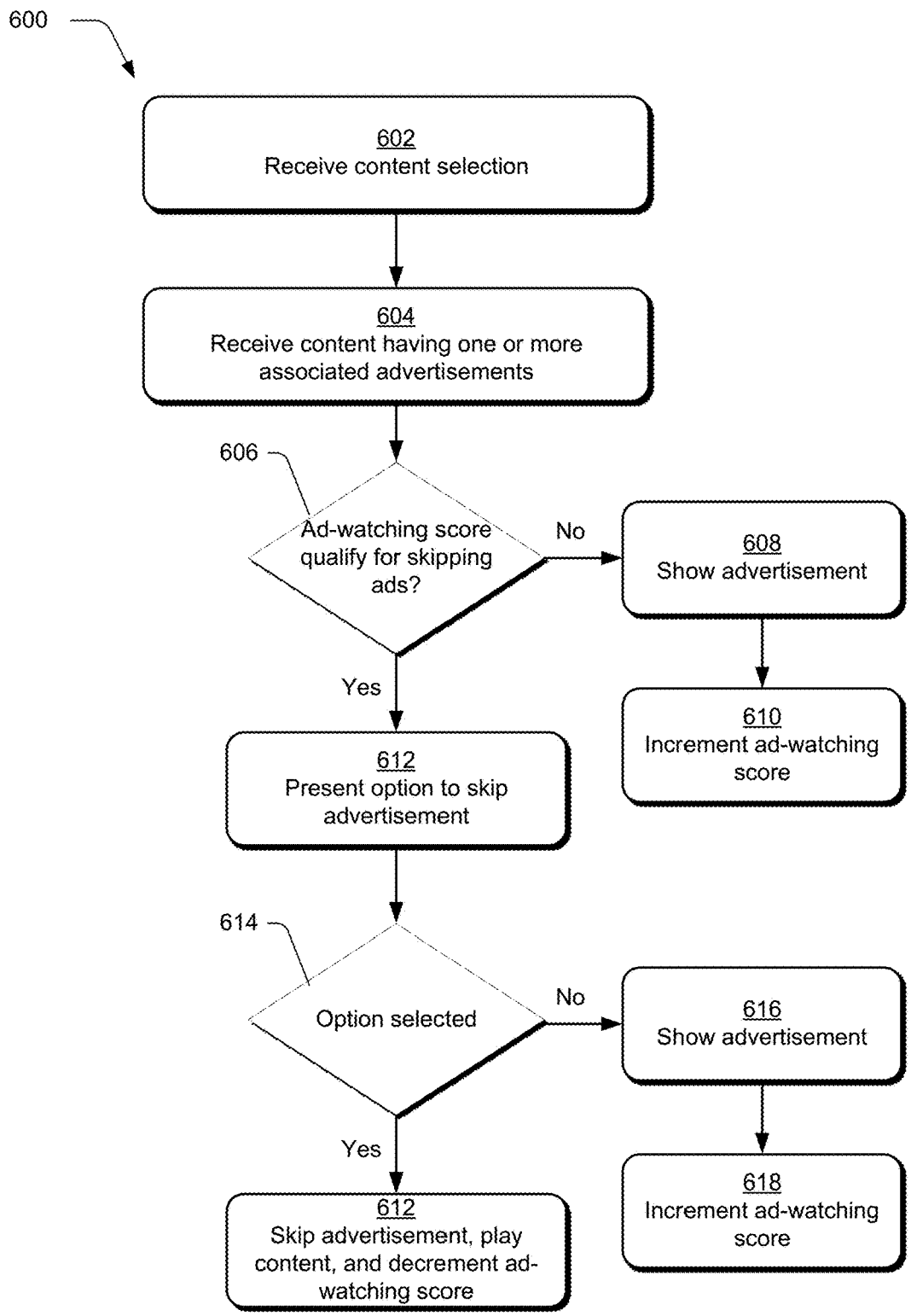
FIG. 6 is a flow diagram depicting an example procedure in accordance with one or more implementations.

FIG. 6 describes an example procedure 600 for skipping advertisements. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a video hosting platform 109, such as that described above.

At block 602, a content selection is received. Any suitable type of content selection can be received. For example, in at least some implementations, the user may select a link in a suitably-configured video player to play a particular piece of content. Responsive to receiving the content selection, content having one or more associated advertisements is received (block 604). This operation can be performed in any suitable way. For example, in some instances, content can be streamed to the user's video player and queued for playing, along with one or more advertisements or links to advertisements. At block 606, a determination is made as to whether the user's advertisement-watching score qualifies for skipping the advertisements. The user's advertisement-watching score can be computed in any suitable way. One example in which a user's advertisement-watching score can be computed is described below and in connection with FIG. 7. It is to be appreciated and understood, however, that a user's advertisement-watching score can be computed in any suitable way without departing from the spirit and scope of the claimed subject matter. In some implementations, the user's score can qualify for skipping advertisements if it meets or exceeds a defined threshold. If the user's advertisement-watching score does not qualify for skipping the advertisements, the advertisements are shown or played (block 608) and the user's advertisement-watching score is incremented (block 610). The operation can continue to process advertisements and content as described above and below.

If, on the other hand, the user's advertisement-watching score qualifies for skipping advertisements, an option is presented to inform the user that they may skip the advertisement (block 612). One example of how this can be done is provided above. A determination is made as to whether the option is selected by the user (block 614). If the option is not selected by the user, the advertisement is shown or played (block 616) and the user's advertisement watching score is incremented (block 618). If, on the other hand, the option is selected by the user, the advertisement is skipped, the content is played, and the user's advertisement-watching score is decremented (block 612). The operation can continue to process advertisements and content as described above and below.

Having considered how advertisements can be skipped, consider now an implementation example of one specific way in which the above-described concept can be implemented. It is to be appreciated and understood, however, that the inventive principles can be implemented in other ways, without departing from the spirit and scope of the claimed subject matter.

Skipping Advertisements—Implementation Example

The various implementations described above and below provide an improved advertisement model that enables users to skip advertisements based on an advertisement-watching score that is calculated for them. That is, when a user logs into video player or an associated video playing account, as the user watches advertisements or, in some cases, portions of advertisements, an advertisement-watching score is computed for them. In the implementation example described below, a user's advertisement-watching score can be increased if a user watches only a portion of an advertisement. That is, in some embodiments, qualifying advertisement portions for increasing the advertisement-watching score can be measured by the time duration of the advertisement watched. For example, in order to increase an advertisement-watching score, a user may be required to watch half of the advertisement. If the advertisement is 30 seconds long, then the user will have to watch 15 second or more of the advertisement. In some embodiments, the video player can note the duration of the advertisement and then monitor how long the user spent playing the advertisement. For example, when an advertisement is received, metadata associated with the advertisement can indicate the duration of the advertisement, e.g., 30 seconds. The video player knows the threshold portion of an advertisement that needs to be watched in order to increase the user's score. As the user watches the advertisement, the video player can start a timer to keep track of the user's viewing duration. If the user's viewing duration exceeds the threshold portion, then the user's advertisement-watching score can be increased. Thus, the advertisement-watching score is calculated as a percentage of the advertisement that the user watches, as long as the user watches a defined percentage of the advertisement. In this manner, the user's computed advertisement-watching score is less than it would be if the user had watched the entire advertisement.

Further, in the implementation example described below, in addition to including a component for watching an advertisement or a portion thereof, the advertisement-watching score includes an additional component whose value is based on whether the user clicked on an advertisement or not. In this manner, the advertisement-watching score includes a component that takes into account not only an advertisement watching parameter, but a click-through parameter as well. Thus, if the user both watches the advertisement and then clicks on the advertisement, their advertisement-watching score is increased an amount for each of these activities. The resulting advertisement-watching score is greater than if the user had simply watched the advertisement, and not clicked on the advertisement. In some implementations, if the user watches the advertisement for only a short period of time (such as less than the defined percentage mentioned above), but clicks on the advertisement, their advertisement-watching score can be increased for only the click through activity.

Thus, the more advertisements that a user watches and/or clicks on, the higher their advertisement-watching score will be. As in the above example, when the user's advertisement-watching score reaches or exceeds a certain threshold, the user is provided with an option to skip subsequent advertisements so that they can consume their content in a generally uninterrupted manner. The option to skip an advertisement can be presented to the user in the form of a selectable user interface instrumentality, such as the one described in FIG. 5, informing the user that their advertisement-watching score value now enables them to skip one or more advertisements.

In this implementation example, when an advertisement is skipped, the user's advertisement-watching score is decreased or decremented by an amount. If the user's advertisement-watching score is decreased to below the threshold, the user cannot skip additional advertisements until the advertisement-watching score reaches or exceeds the threshold. The user can cause their advertisement-watching score to increase by watching additional advertisements.

Having considered these general notions of an implementation example, consider now a specific example of how these general notions can be implemented. During the discussion of this implementation example, the following nomenclature, as set forth in the table below, will be used:

| Term | Definition |
|---|---|
| AWS | Advertisement-Watching Score |
| Pw | Points for watching an advertisement (each advertisement may have different points); the points can be set by the advertiser and can be a function of the cost of the advertisement |
| Pc | Points for clicking an advertisement (each advertisement may have different points); the points can be set by the advertiser and can be a function of the cost of the advertisement; in some instances, Pc and Ps are equal or linearly proportional |
| Tw | Percentage of the advertisement watched |
| Ca | Advertisement clicked or not clicked (Boolean value of 1 or 0) |
| Ts | Minimum threshold points required to skip an advertisement; the points can be set by the video hosting platform |
| Ps | Points needed for skipping an advertisement (each advertisement may have different points); the points can be set by the advertiser and can be a function of the cost of the advertisement; in some instances, Pc and Ps are equal or linearly proportional |

Having introduced the nomenclature above, consider now one implementation in connection with calculating an advertisement-watching score. An advertisement-watching score can be calculated in any suitable way. As but one example, consider the following formula which is used to calculate and update the advertisement-watching score:

$$AWS=(Pw*Tw)+(Pc*Ca)$$

Here, the advertisement-watching score includes two components. The first of the components, (Pw*Tw), is the product of the points for watching an advertisement and the percentage of the advertisement watched. The second of the components, (Pc*Ca), is the product of the points for clicking an advertisement and whether or not the advertisement was clicked. If the advertisement was not clicked (Ca=0), then this term does not factor into the advertisement-watching score. In some implementations, the "Tw" term in the first component can be utilized as a condition for calculating or updating the advertisement-watching score. That is to say, if "Tw" is set at 50 percent or 0.5 as a condition for calculating or updating the advertisement-watching score, then the user must watch at least half of an advertisement in order for the advertisement-watching score to be calculated or updated. In other instances, "Tw" can be used as a condition for computing the term (Pw*Tw), but not the overall advertisement-watching score to take into account situations where a user clicks an advertisement before Tw is reached. So, in scenarios where Tw is used as a condition for computing the overall score, if an advertisement is 30 seconds long, the user must watch at least 15 seconds of the advertisement in order for their advertisement-watching score to be calculated or updated. In practice, this can be represented as follows:

```
If (Tw > 0.5)
{
    AWS += (Pw*Tw) + (Pc*Ca)
}
```

As an example, consider the following scenario. Assume that the user's current advertisement-watching score (AWS) is equal to 28. Assume also the following values for the following terms:
Pw=2
Tw=0.6
Pc=5
Ca=1

In this case, if the user watches the entire advertisement to completion, the user will be awarded two points (Pw=2). In actuality, the user only watched 60 percent of the advertisement (Tw=0.6). If the user clicks on the advertisement, the user will be awarded five points (Pc=5). In actuality, the user clicked on the advertisement (Ca=1). Using these values, the user's advertisement-watching score is updated as follows:
AWS=28+(2*0.6)+(5*1);
AWS=28+1.2+5;
AWS=34.2;

Having generated an advertisement-watching score by virtue of watching a number of advertisements, the user may now employ their advertisement-watching score to skip advertisements. In this particular instance, if the user's advertisement-watching score is more than a minimum threshold (Ts) required to skip an advertisement, the user is presented with an option to skip the advertisement when it is time for the advertisement to play. If the user chooses to skip the advertisement when presented with the option to do so, the advertisement is skipped and the advertisement-watching score is decreased by the points needed for skipping an advertisement (Ps). Using the advertisement-watching score of 34.2 computed above, assume the following values for the following terms:
Ts=30
Ps=5

Here, the minimum threshold required to skip an advertisement is 30 (Ts=30) and 5 points are needed to skip an advertisement (Ps=5). Assuming that the user opts to skip the advertisement, the user's advertisement-watching score (AWS) is recomputed as follows:
AWS=34.2−5
AWS=29.2

In this instance, the user's advertisement-watching score has been reduced by five points. Accordingly, the user's new advertisement-watching score is 29.2. Note that because the user's new advertisement-watching score is below the minimum threshold required to skip an advertisement, the user will need to watch at least one advertisement to increase their score above the threshold if they wish to skip additional advertisements.

Having considered an implementation example, consider now an example procedure.

Figure 7:
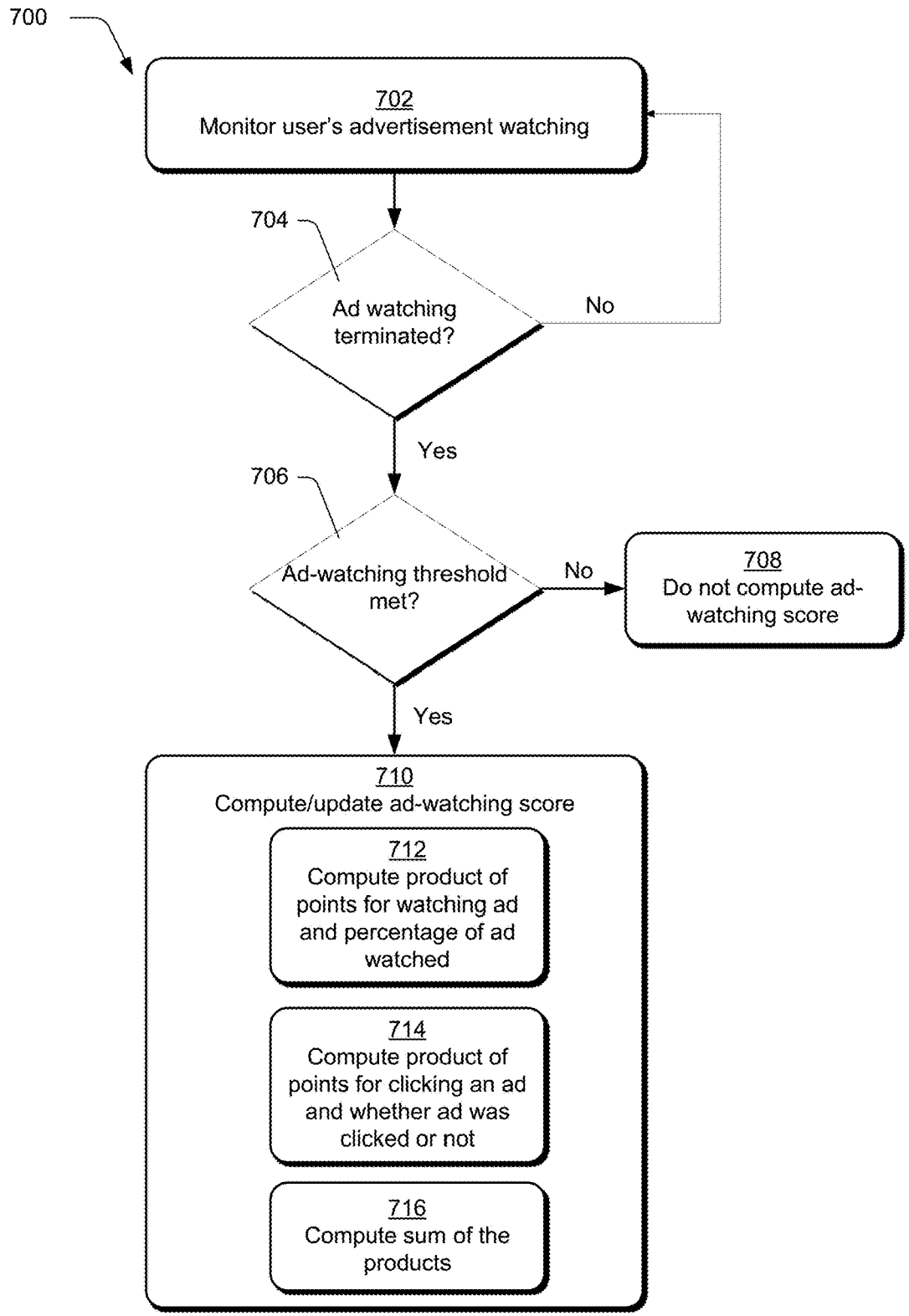
FIG. 7 is a flow diagram depicting an example procedure in accordance with one or more implementations.

FIG. 7 describes an example procedure 700 for computing an advertisement-watching score. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a video hosting platform and video player 109, such as that described above.

In this example, the procedure assumes that a user has logged into an associated video player or account and is actively engaged in consuming content. During the user's content consumption activities, the user's advertisement watching is monitored (block 702). This operation can be performed by monitoring the amount time that the user watches a particular advertisement. A determination is made as to whether the user's advertisement watching has been terminated (block 704). If the user's advertisement watching has not been terminated and the user is still watching the advertisement, the operation returns to block 702 to continue monitoring the advertisement watching. If, on the other hand, the user's advertisement watching has been terminated, a determination is made as to whether an advertisement-watching threshold has been met (block 706). In some instances, an advertisement-watching threshold can be defined as a percentage of an advertisement that is to be watched. For example, an advertisement-watching threshold might be set at 50 percent. In this example, the advertisement-watching threshold serves as a condition for computing or updating the user's advertisement-watching score (assuming that the user has not clicked on an advertisement). If the advertisement-watching threshold has not been met, then the advertisement-watching score is not computed or updated (block 708). In some instances, however, if the user clicks on an advertisement before the threshold is met, the advertisement-watching score is computed or updated to take into account the click through. If, on the other hand, the advertisement-watching threshold is met, the user's advertisement-watching score is computed or updated. This operation can be performed in any suitable way.

In at least some implementations, the user's advertisement-watching score is computed (block 710) by first computing the product of the points awarded for watching an advertisement and the percentage of the advertisement watched (block 712). An example of how this can be done is provided above. Next, the product of points awarded for clicking an advertisement and whether or not an advertisement was clicked or not is computed (block 714). Whether or not an advertisement was clicked can be represented as a Boolean value of either "1" for clicking an advertisement, or a "0" for not clicking an advertisement. Next, the sum of both products is computed (block 716).

If this is the first time that the user's advertisement-watching score has been computed, then their score is simply the sum of the computed products as described just above. If, on the other hand, the user has had an advertisement-watching score previously computed, their updated advertisement-watching score is the sum of the previously-computed advertisement-watching score and the advertisement-watching score that was just computed.

Having computed the advertisement-watching score, the score can now be employed in a procedure such as that described in FIG. 6. Of course, it is to be appreciated and understood that the user's advertisement-watching score can be computed in any suitable way using any suitable parameters. As such, the example represented by blocks 712, 714, and 716 constitute but one way in which the user's advertisement-watching score can be computed.

Having considered the above implementations, consider now an example system and device that can be utilized to practice the inventive principles described herein.

Example System and Device

Figure 8:
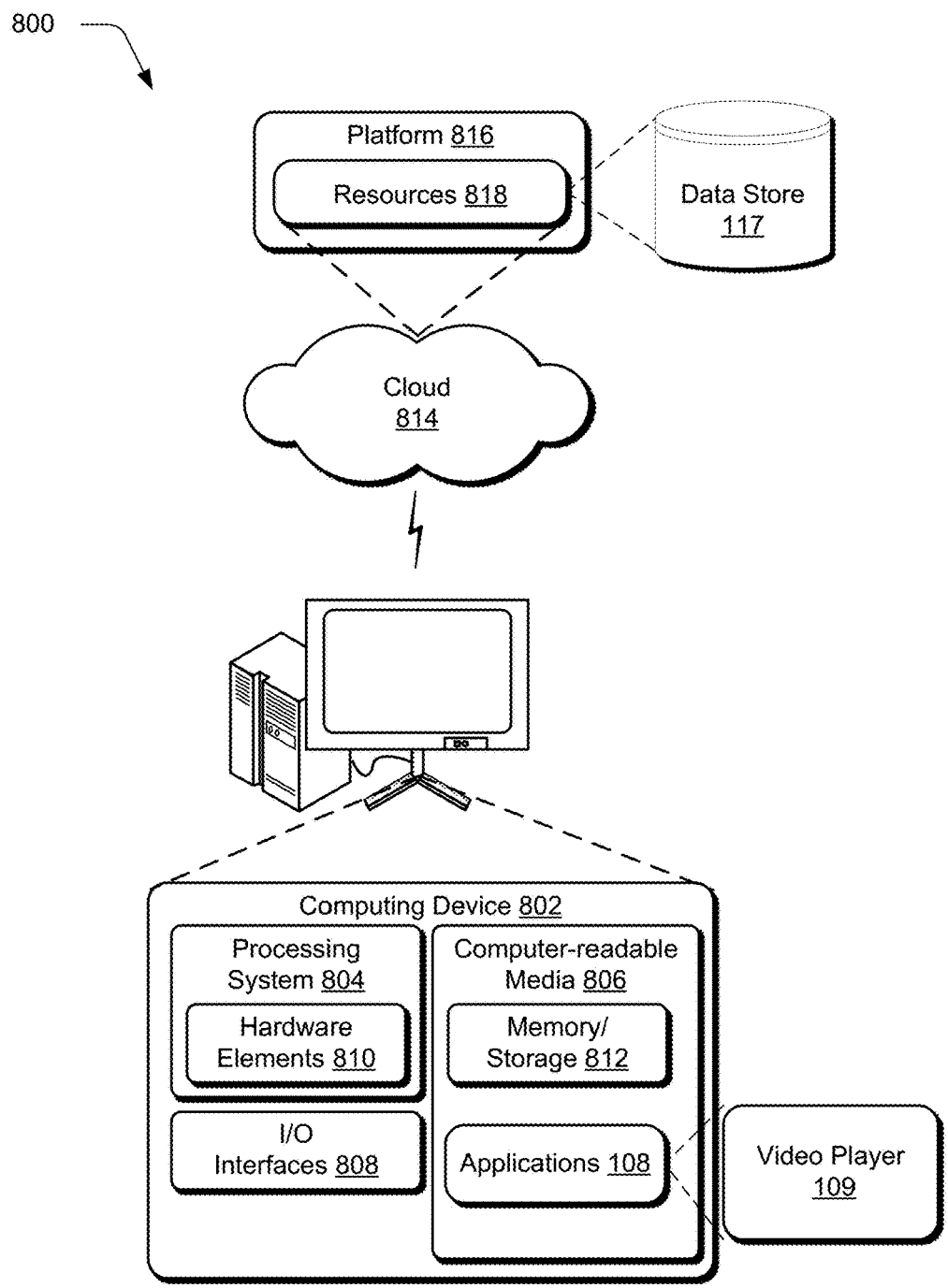
FIG. 8 illustrates an example system including various components of an example device that can be employed for one or more search implementations described herein.

FIG. 8 illustrates an example system generally at 800 that includes an example computing device 802 that is representative of one or more computing systems and/or devices that may implement the various techniques described herein. This is illustrated through inclusion of the applications 108 and, in particular, video player application 109, which operates as described above. The computing device 802 may be, for example, a server of a service provider, a device associated with a client (e.g., a client device), an on-chip system, and/or any other suitable computing device or computing system.

The example computing device 802 is illustrated as including a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

CONCLUSION

Various implementations provide an improved advertisement model that enables users to skip advertisements based on an advertisement-watching score. That is, as a user watches advertisements or, in some cases, portions of advertisements, an advertisement-watching score is computed. The more advertisements that a user watches, the higher their advertisement-watching score will be. When the user's advertisement-watching score reaches or exceeds a certain threshold, the user is provided with an option to skip subsequent advertisements so that they can consume their content in a generally uninterrupted manner. When an advertisement is skipped, the user's advertisement-watching score is decreased by an amount. If the user's advertisement-watching score is decreased to below the threshold, the user cannot skip additional advertisements until the advertisement-watching score again reaches or exceeds the threshold. The user can cause their advertisement-watching score to increase by watching additional advertisements or, in some cases, portions of advertisements.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including a computing device configured to enable use of a video player to play video content and advertisements in a video hosting platform, the video player implementing an advertisement skipping method comprising:

receiving the video content comprising one or more advertisements;

receiving advertising playback data that indicates a percentage played back of each of the one or more advertisements and whether or not each of the one or more advertisements are clicked for selection to cause an automatic redirection to an advertiser's website;

computing an advertisement-watching score based on the advertising playback data, the advertisement-watching score computed as a product of points available for playback of an advertisement multiplied by a percentage of the advertisement played back, added to a product of points available for clicking on the advertisement multiplied by either a one if the advertisement is clicked on or a zero if the advertisement is not clicked on;

determining whether the advertisement-watching score meets or exceeds a score threshold value; and skipping past at least one of the one or more advertisements and continuing playback of the video content based on the advertisement-watching score meeting or exceeding the score threshold value.

2. A method as described in claim 1 further comprising responsive to the advertisement-watching score not meeting the score threshold value playing the at least one advertisement and incrementing the advertisement-watching score.

3. A method as described in claim 1, wherein said skipping past one of the one or more advertisements further comprises displaying a selectable interface instrumentality to enable the at least one advertisement to be skipped.

4. A method as described in claim 1 further comprising responsive to the at least one advertisement being skipped, decrementing the advertisement-watching score.

5. A method as described in claim 1, wherein the advertisement-watching score is incremented based on complete playback of at least one of the one or more advertisements.

6. A method as described in claim 1, wherein the advertisement-watching score is incremented based on at least one of the one or more advertisements clicked for selection.

7. A system implemented in a digital medium environment for video content and advertisements served to a computing device, the system comprising:
one or more hardware processors to implement a video player of the computing device; and
computer readable storage media storing computer-executable instructions, executable via the one or more hardware processors, to implement an advertisement skipping technique of the video player by performing operations comprising:
receiving the video content comprising one or more advertisements;
receiving advertising playback data that indicates a percentage played back of each of the one or more advertisements and whether or not each of the one or more advertisements are clicked for selection to cause an automatic redirection to an advertiser's website;
computing an advertisement-watching score based on the advertising playback data, the advertisement-watching score computed as a product of points available for playback of an advertisement multiplied by a percentage of the advertisement played back, added to a product of points available for clicking on the advertisement multiplied by either a one if the advertisement is clicked on or a zero if the advertisement is not clicked on;
determining whether the advertisement-watching score meets or exceeds a score threshold value; and
skipping past at least one of the one or more advertisements and continuing playback of the video content based on the advertisement-watching score meeting or exceeding the score threshold value.

8. A system as described in claim 7 further comprising responsive to the advertisement-watching score not meeting the score threshold value, playing at least one of the one or more advertisements and incrementing the advertisement-watching score.

9. A system as described in claim 7 further comprising responsive to at least one of the one or more advertisements being skipped, decrementing the advertisement-watching score.

10. A method as described in claim 1, wherein the advertisement-watching score is incremented based on a predefined percentage of advertisements played back.

11. A system as described in claim 7, wherein the advertisement-watching score is incremented based on a predefined percentage of advertisements played back.

12. A system as described in claim 7, wherein the advertisement-watching score is incremented based on complete playback of at least one of the one or more advertisements.

13. A system as described in claim 7, wherein the advertisement-watching score is incremented based on at least one of the one or more advertisements clicked for selection.

14. A system as described in claim 7, wherein the one or more hardware processors implement the video player to initiate displaying a selectable interface instrumentality to enable at least one of the one or more advertisements to be skipped.

15. A computing device that implements a video player to play video content and one or more advertisements in a video hosting platform in a digital medium environment, the computing device comprising:
a memory to maintain advertising playback data that indicates a percentage played back of each of the one or more advertisements and whether or not each of the one or more advertisements are clicked for selection;
a processor system configured to execute a video player implemented to:
receive the video content and the one or more advertisements;
compute an advertisement-watching score based on the advertising playback data, the advertisement-watching score computed as a product of points available for playback of an advertisement multiplied by a percentage of the advertisement played back, added to a product of points available for clicking on the advertisement multiplied by either a one if the advertisement is clicked on or a zero if the advertisement is not clicked on;
skip past at least one of the one or more advertisements and continue playback of the video content if the advertisement-watching score meets or exceeds a score threshold value; or
playback at least one of the one or more advertisements when the advertisement-watching score does not meet or exceed the score threshold value.

16. A computing device as described in claim 15, wherein the video player is implemented to initiate display of a selectable interface instrumentality to enable the at least one advertisement to be skipped.

17. A computing device as described in claim 15, wherein the video player is implemented to decrement the advertisement-watching score if the at least one of the one of more advertisements is skipped.

18. A computing device as described in claim 15, wherein the video player is implemented to increment the advertisement-watching score if a predefined percentage of the at least one of the one or more advertisements is played back.

19. A computing device as described in claim 15, wherein the video player is implemented to increment the advertisement-watching score based on complete playback of at least one of the one or more advertisements.

20. A computing device as described in claim 15, wherein the video player is implemented to increment the advertisement-watching score based on at least one of the one or more advertisements clicked for selection.

* * * * *